US011805314B2

(12) United States Patent
Yamada et al.

(10) Patent No.: US 11,805,314 B2
(45) Date of Patent: Oct. 31, 2023

(54) CONTROL DEVICE, CONTROL METHOD, AND INFORMATION PROCESSING SYSTEM

(71) Applicant: SONY GROUP CORPORATION, Tokyo (JP)

(72) Inventors: Naohide Yamada, Tokyo (JP); Koji Kamiya, Tokyo (JP); Satoshi Tsubaki, Tokyo (JP); Kei Kakidani, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/756,477

(22) PCT Filed: Sep. 15, 2020

(86) PCT No.: PCT/JP2020/034908
§ 371 (c)(1),
(2) Date: May 25, 2022

(87) PCT Pub. No.: WO2021/111700
PCT Pub. Date: Jun. 10, 2021

(65) Prior Publication Data
US 2022/0417431 A1 Dec. 29, 2022

(30) Foreign Application Priority Data
Dec. 3, 2019 (JP) ................. 2019-218960

(51) Int. Cl.
H04N 23/667 (2023.01)
H04N 23/63 (2023.01)
H04N 5/77 (2006.01)

(52) U.S. Cl.
CPC ........... H04N 23/667 (2023.01); H04N 23/63 (2023.01); H04N 5/77 (2013.01)

(58) Field of Classification Search
CPC .................................... H04N 23/667
(Continued)

(56) References Cited

U.S. PATENT DOCUMENTS

2009/0103898 A1 4/2009 Morioka et al.
2012/0188410 A1 7/2012 Obata
(Continued)

FOREIGN PATENT DOCUMENTS

CN 108184048 A 6/2018
CN 109791342 A 5/2019
(Continued)

OTHER PUBLICATIONS

International Search Report and Written Opinion of PCT Application No. PCT/JP2020/034908, dated Oct. 27, 2020, 10 pages of ISRWO.

Primary Examiner — Joel W Fosselman
(74) Attorney, Agent, or Firm — CHIP LAW GROUP

(57) ABSTRACT

Imaging-related information such as information regarding the position or orientation of a camera is output in an appropriate manner. A control device according to the present technology includes: a determination unit that determines a usage mode of an imaging device; and a control unit that performs output control of imaging-related information related to the imaging device on the basis of the usage mode determined by the determination unit. Performing the output control of the imaging-related information on the basis of the usage mode of the imaging device makes it possible to perform control so as not to output unnecessary information according to the usage mode of the camera. For example, in a case of a fixed camera that does not move, the imaging-related information as position information of the camera is not output, and in a case of a handy camera that is assumed to move, the imaging-related information as the position information of the camera is output.

15 Claims, 11 Drawing Sheets

(58) Field of Classification Search
USPC .................................................. 348/222.1
See application file for complete search history.

(56) References Cited

U.S. PATENT DOCUMENTS

| | | | |
|---|---|---|---|
| 2015/0207992 A1* | 7/2015 | Kato | H04N 9/8042 |
| | | | 348/220.1 |
| 2018/0167558 A1 | 6/2018 | Hirai et al. | |
| 2019/0246060 A1 | 8/2019 | Tanabe et al. | |
| 2019/0260936 A1 | 8/2019 | Imanishi | |

FOREIGN PATENT DOCUMENTS

| | | |
|---|---|---|
| EP | 2063635 A1 | 5/2009 |
| JP | 09-289606 A | 11/1997 |
| JP | 2008-054155 A | 3/2008 |
| JP | 2012058524 A | 3/2012 |
| JP | 2012-165350 A | 8/2012 |
| JP | 2018-097870 A | 6/2018 |
| JP | 2019-140460 A | 8/2019 |
| KR | 10-2018-0065957 A | 6/2018 |
| WO | 2008/032739 A1 | 3/2008 |
| WO | 2018/051731 A1 | 3/2018 |

\* cited by examiner

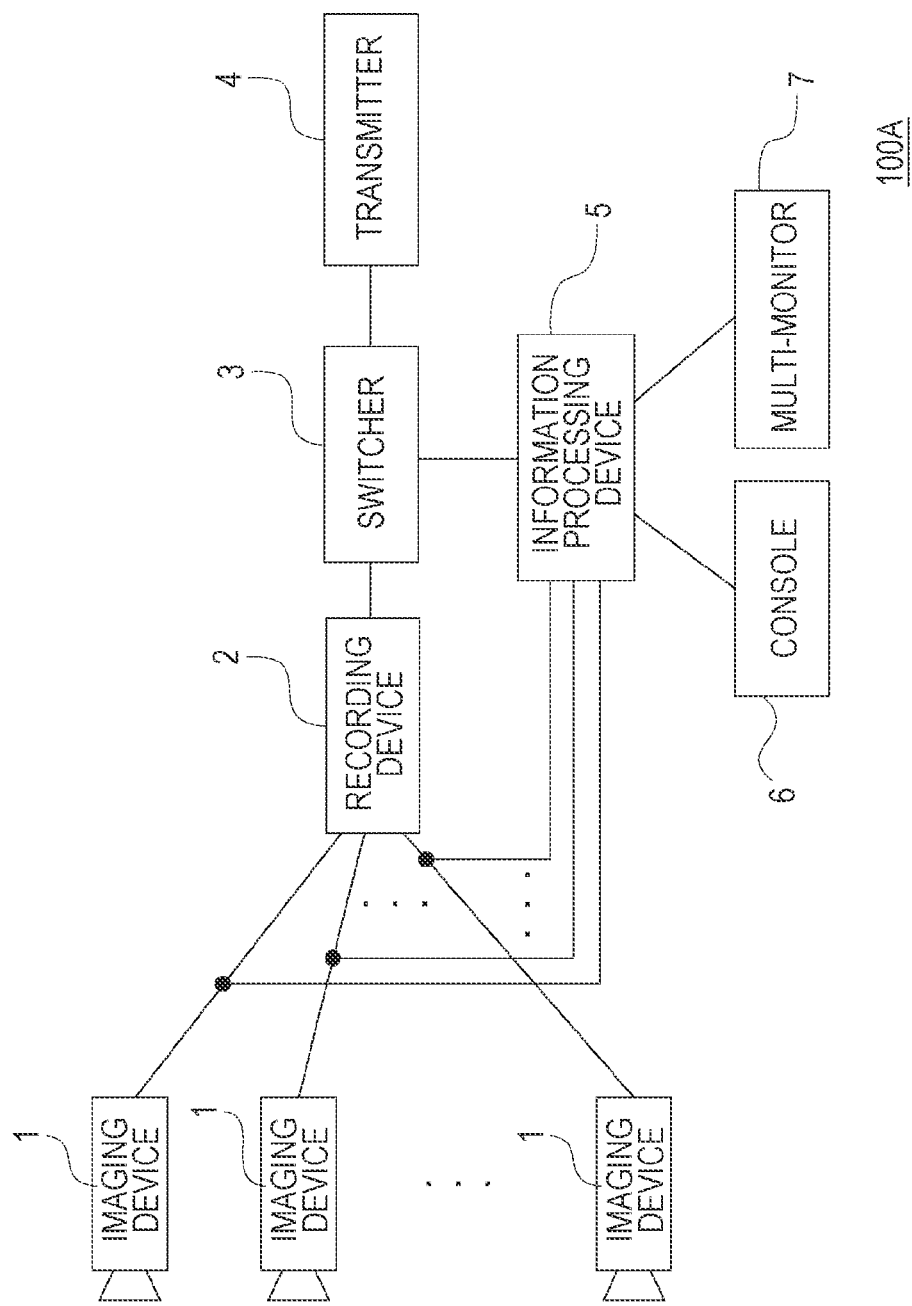

CONTROL DEVICE, CONTROL METHOD, AND INFORMATION PROCESSING SYSTEM

CROSS REFERENCE TO RELATED APPLICATIONS

This application is a U.S. National Phase of International Patent Application No. PCT/JP2020/034908 filed on Sep. 15, 2020, which claims priority benefit of Japanese Patent Application No. JP 2019-218960 filed in the Japan Patent Office on Dec. 3, 2019. Each of the above-referenced applications is hereby incorporated herein by reference in its entirety.

TECHNICAL FIELD

The present technology relates to a control device, a control method, and an information processing system, and particularly relates to a technical field related to output control of imaging-related information, which is information related to imaging.

BACKGROUND ART

There is a broadcasting system that transmits and records an image selected by an operator from among captured images captured by a plurality of cameras (imaging devices) for broadcasting, such as a broadcasting system used for sports broadcasting, for example.

In this type of broadcasting system, it is conceivable to display, to the operator, information indicating the state of each camera, such as the arrangement position of the camera and the direction in which the camera is oriented. Performing such display makes it possible for the operator to easily grasp the state of each camera and to intuitively understand which camera captured image should be selected.

Note that Patent Document 1 below can be cited as a related conventional technology.

CITATION LIST

Patent Document

Patent Document 1: Japanese Patent Application Laid-Open No. 9-289606

SUMMARY OF THE INVENTION

Problems to be Solved by the Invention

Here, in displaying the state information of each camera such as the position and direction of the camera as described above, it is conceivable to output information indicating the position and direction from the camera side as, for example, metadata or the like of a captured image. That is, imaging-related information as information related to imaging is output from the camera side.

At this time, regarding the output of the imaging-related information, an output mode such as the frequency of the output and the type of information to be output should be optimized.

Solutions to Problems

A control device according to the present technology includes: a determination unit that determines a usage mode of an imaging device; and a control unit that performs output control of imaging-related information related to the imaging device on the basis of the usage mode determined by the determination unit.

The imaging-related information means information related to imaging. For example, the imaging-related information can include information indicating the position of the imaging device (corresponding to the position of the imaging viewpoint), information regarding the focal length, information indicating the imaging direction (for example, information indicating the orientation in a pan direction or a tilt direction in a case of using the imaging device on a tripod, azimuth information by an azimuth sensor, and the like), information indicating the motion of the imaging device, such as acceleration and angular velocity acting on the imaging device, information regarding the moving speed of the imaging device, and the like. Furthermore, examples of the usage mode of the imaging device include usage modes as a fixed camera, a handy camera, a camera mounted on a mobile device, and the like. Performing the output control of the imaging-related information on the basis of the usage mode of the imaging device as described above makes it possible to perform control so as not to output unnecessary information according to the usage mode of the camera. For example, in the case of the fixed camera that does not move, the imaging-related information as the position information of the camera is not output, and in the case of the handy camera that is assumed to move, the imaging-related information as the position information of the camera is output. Alternatively, the type of the imaging-related information to be output can be changed according to the usage mode of the camera.

In the control device according to the present technology described above, the determination unit may make at least determination as to whether the usage mode of the imaging device is a usage mode as a fixed camera or a usage mode as a handy camera, as the determination of the usage mode.

For example, in a case where the position information of the imaging device is output as the imaging-related information, the fixed camera has a fixed position, and thus basically does not need to output the position information. On the other hand, the handy camera is likely to move by being held by a camera operator, the position of the handy camera should be checked at a high frequency, and thus it is required to increase the output frequency of the position information. As described above, for the fixed camera and the handy camera, there is a case where an output mode of specific imaging-related information should be changed.

In the control device according to the present technology described above, the determination unit may determine whether the usage mode of the imaging device is the usage mode as the fixed camera, the usage mode as the handy camera, or a usage mode as a camera mounted on a mobile device.

With this configuration, it is determined whether the usage mode of the camera whose position is not fixed is the usage mode as the handy camera or the usage mode as the camera mounted on the mobile device.

In the control device according to the present technology described above, the control unit may reduce an output frequency of the imaging-related information in a case where the determination unit determines that the imaging device is the fixed camera as compared with a case where the determination unit determines that the imaging device is the handy camera.

For the fixed camera, even if the output frequency of the imaging-related information is reduced, a function on the side of an application using the imaging-related information may not be impaired, and thus, for example, in the case of the fixed camera, it is possible to omit the output of the position information.

In the control device according to the present technology described above, in a case where the determination unit determines that the imaging device is the camera mounted on the mobile device, the control unit may set an output frequency of the imaging-related information higher than an output frequency of the imaging-related information in a case where the imaging device is determined to be the fixed camera and lower than an output frequency of the imaging-related information in a case where the imaging device is determined to be the handy camera.

For example, in the case of the camera mounted on the mobile device as a vehicle, a stand that moves on a rail, or the like, the movement direction can be predicted to some extent as compared with the case of the handy camera, and thus there is a case where the function on the side of the application using the imaging-related information is not impaired even if the imaging-related information is not frequently output as in the case of the handy camera.

In the control device according to the present technology described above, the determination unit may determine the usage mode on the basis of detection information of a sensor.

For example, the usage mode of the camera is determined on the basis of detection information of a motion sensor that detects the motion of the imaging device, such as an acceleration sensor or an angular velocity sensor, a position sensor that detects the position of the imaging device, or the like.

In the control device according to the present technology described above, the determination unit may determine the usage mode on the basis of detection information of a motion sensor that detects a motion of the imaging device.

The usage mode is determined on the basis of detection information of the motion sensor that detects the motion of the imaging device, such as an acceleration sensor or an angular velocity sensor, for example. As a result, it is possible to detect characteristics of motion specific to the handy camera, such as motion of the camera due to camera shake, for example.

In the control device according to the present technology described above, the determination unit may determine the usage mode on the basis of detection information of a position sensor that detects a position of the imaging device.

This configuration makes it possible to determine the usage mode on the basis of a change mode of the camera position.

In the control device according to the present technology described above, the imaging-related information may include position information of the imaging device.

This configuration makes it possible to output the position information as the imaging-related information, and it is possible to implement, as the application using the imaging-related information, an application that shows a user such as an operator the camera position, for example, on a map or the like.

In the control device according to the present technology described above, the control unit may change a type of the imaging-related information to be output on the basis of a result of the determination by the determination unit.

This configuration makes it possible to output an appropriate type of imaging-related information according to the usage mode of the camera.

In the control device according to the present technology described above, the determination unit may make at least determination as to whether or not the usage mode of the imaging device is a usage mode as a camera mounted on a mobile device, as the determination of the usage mode, and the control unit may perform processing of outputting speed information of the imaging device as the imaging-related information in a case where the determination unit determines that the imaging device is the camera mounted on the mobile device.

For example, in the case of the camera mounted on the mobile device as a vehicle, a stand that moves on a rail, or the like, the movement direction can be predicted to some extent as compared with the case of the handy camera, and thus, the position can be predicted on the basis of the speed information.

In the control device according to the present technology described above, the control unit may perform processing of outputting pan information of the imaging device as the imaging-related information in a case where the pan information can be acquired from a fixing device that fixes the imaging device rotatably at least in a pan direction, and perform processing of outputting azimuth information detected by an azimuth sensor that detects an azimuth of the imaging device as the imaging-related information in a case where the pan information cannot be acquired from the fixing device.

The pan information means angle information in the pan direction of the imaging device. According to the above configuration, in a case where the pan information cannot be acquired, the azimuth information as alternative information of the pan information is output.

In the control device according to the present technology described above, the determination unit may determine whether or not the usage mode of the imaging device is the usage mode as the fixed camera by determining connection of the imaging device to a fixing device that fixes the imaging device.

With this configuration, it is not necessary to acquire motion information of the imaging device or perform analysis processing such as waveform analysis on the motion information in determining whether or not the imaging device is the fixed camera.

In the control device according to the present technology described above, the determination unit may determine the usage mode on the basis of plan information of the usage mode set for each of a plurality of the imaging devices.

With this configuration, it is not necessary to acquire the motion information or the position information of the imaging device or to perform the analysis processing on the motion information or the position information in determining the usage mode.

A control method according to the present technology is a control method including: determining a usage mode of an imaging device; and performing output control of imaging-related information related to the imaging device on the basis of the determined usage mode.

Even with such a control method, it is possible to obtain actions similar to those of the control device according to the present technology described above.

An information processing system according to the present technology includes: a control device including a determination unit that determines a usage mode of an imaging device, and a control unit that performs output control of imaging-related information related to the imaging device on the basis of the usage mode determined by the determination unit; and an information processing device including a display processing unit that performs display processing of information based on the imaging-related information output by the output control of the control unit.

Even with such an information processing system, it is possible to obtain actions similar to those of the control device according to the present technology described above.

Furthermore, the information processing system according to the present technology described above may further include a stop determination unit that determines whether or not the imaging device has stopped after movement, and the display processing unit may perform display processing of making notification of the imaging device determined to have stopped after movement by the stop determination unit.

The imaging device that has stopped after movement can be estimated to be an imaging device that has moved to a position near a subject to be imaged and is preparing for an interview or the like or has completed the preparation.

BRIEF DESCRIPTION OF DRAWINGS

FIG. 11 is a block diagram illustrating a configuration as a modification of the information processing system as the embodiment.

MODE FOR CARRYING OUT THE INVENTION

Hereinafter, embodiments according to the present technology will be described in the following order.
    <1. Configuration of information processing system>
    [1-1. Overall system configuration]
    [1-2. Configuration of imaging device]
    [1-3. Configuration of information processing device]
    <2. Processing as embodiment>
    [2-1. Output control of imaging-related information]
    [2-2. Notification display]
    <3. Modification>
    <4. Summary of Embodiments>
    <5. Present technology>

1. Configuration of Information Processing System

[1-1. Overall System Configuration]

Figure 1:
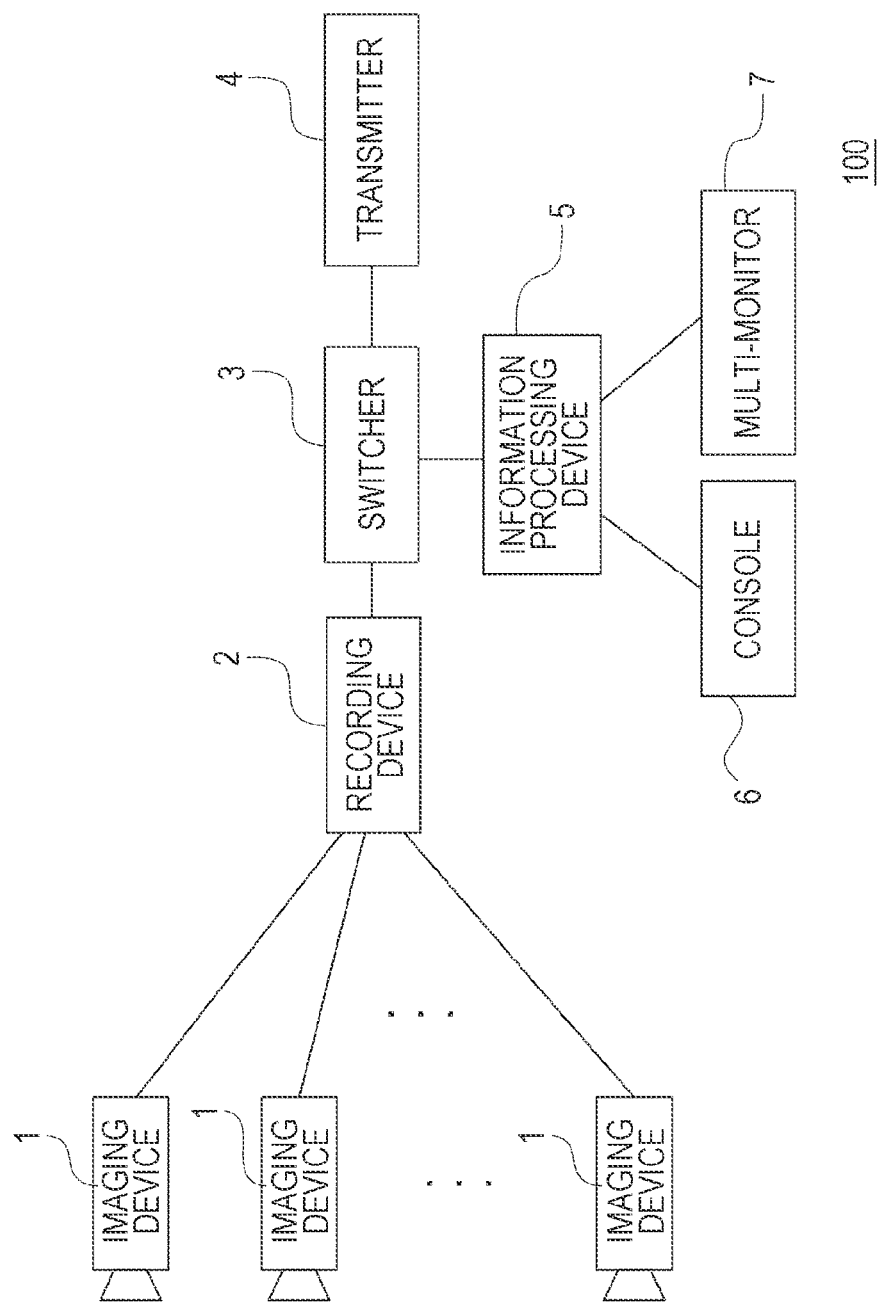
FIG. 1 is a block diagram illustrating a configuration example of an information processing system as an embodiment according to the present technology.

FIG. 1 is a block diagram illustrating a configuration example of an information processing system 100 as an embodiment.

The information processing system 100 according to the embodiment is configured as a broadcasting system having a function of transmitting an image selected by an operator from among captured images captured by a plurality of cameras (imaging devices) for broadcasting.

As illustrated, the information processing system 100 includes a plurality of imaging devices 1, a recording device 2, a switcher 3, a transmitter 4, an information processing device 5, a console 6, and a multi-monitor 7. Among these components, each of the imaging devices 1 is an embodiment of a control device according to the present technology, and the information processing device 5 is an embodiment of an information processing device according to the present technology.

The imaging device 1 obtains a captured image obtained by imaging a subject and outputs the captured image and imaging-related information to the recording device 2.

Here, the imaging-related information means information related to imaging. For example, the imaging-related information can include information indicating the position of the imaging device 1 (corresponding to the position of the imaging viewpoint), information regarding the focal length, information indicating the imaging direction (for example, information indicating the orientation in a pan direction or a tilt direction in a case of using the imaging device 1 on a tripod, azimuth information by an azimuth sensor, and the like), information indicating the motion of the imaging device 1, such as acceleration and angular velocity acting on the imaging device 1, information regarding the moving speed of the imaging device 1, and the like. Note that the information indicating the position of the imaging device 1 is not limited to position information in the horizontal direction by latitude and longitude, for example, and may include position information in the vertical direction by altitude.

The imaging-related information is information related to imaging as described above, and the captured image itself obtained by imaging is not included in the imaging-related information.

In the present example, the imaging device 1 outputs the captured image in the form of moving image data. Furthermore, the imaging device 1 in the present example adds and outputs the imaging-related information as metadata of the captured image.

The recording device 2 includes a storage device such as a hard disk drive (HDD) or a flash memory device, for example, and records a captured image (to which imaging-related information is added in the present example) as moving image data output from each of the imaging devices 1 and outputs the captured image to the switcher 3. Furthermore, the recording device 2 can add a video effect such as a replay to a captured image as recorded moving image data on the basis of an operation input and output the captured image to the switcher 3.

The switcher 3 selects a captured image to be output to the transmitter 4 from among captured images from the imaging devices 1 input via the recording device 2 on the basis of an instruction from the information processing device 5.

The transmitter 4 transmits the captured image selected by the switcher 3 as broadcast.

The captured images output from the recording device 2 are input to the information processing device 5 via the switcher 3.

The information processing device 5 is connected to the console 6 provided with various operation elements used for operation by a user as the operator and a display device as the multi-monitor 7, causes the multi-monitor 7 to display each captured image input to the switcher 3, and instructs the switcher 3 on the captured image to be output to the transmitter 4 on the basis of an operation input of the user via the console 6.

Note that the multi-monitor 7 may be a single display device, or may include a plurality of display devices that individually display captured images.

[1-2. Configuration of Imaging Device]

Figure 2:
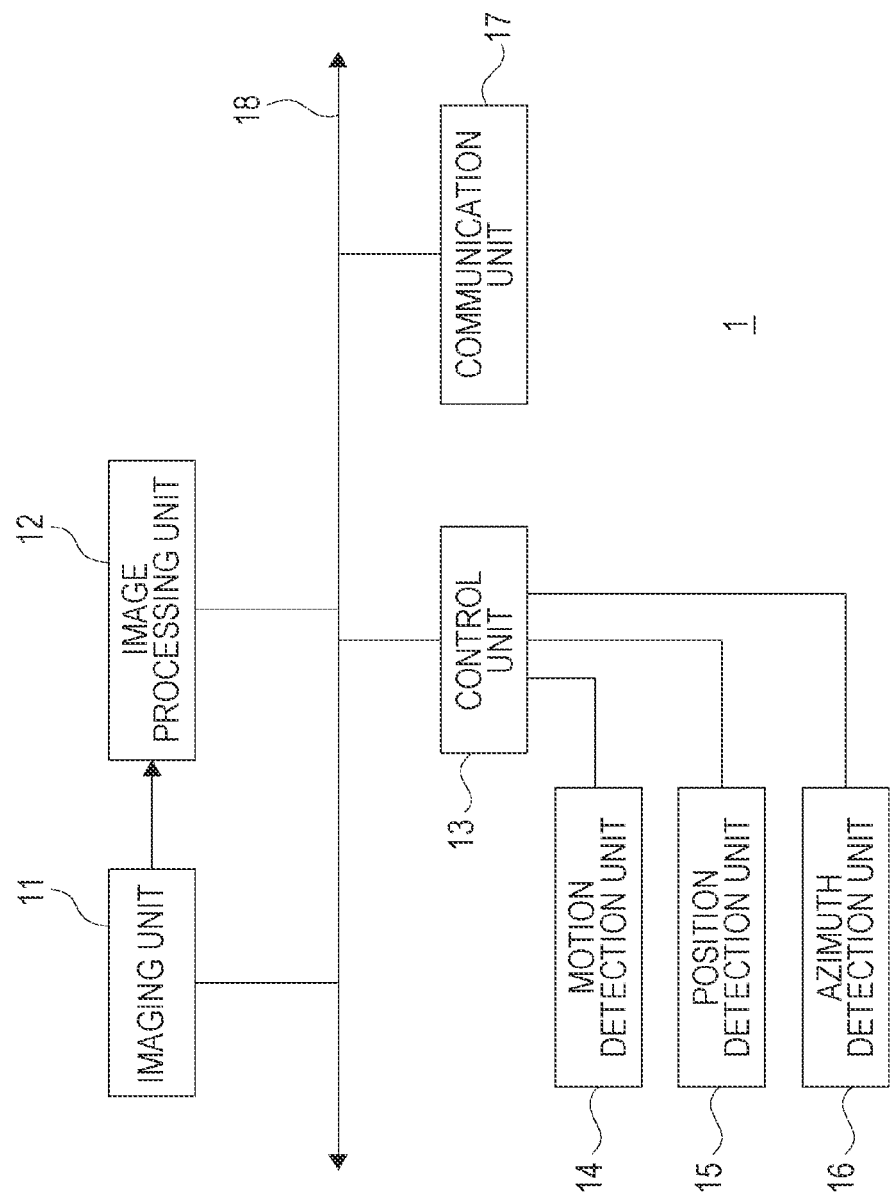
FIG. 2 is a block diagram illustrating an internal configuration example of an imaging device according to the embodiment.

FIG. 2 is a block diagram illustrating an internal configuration example of each of the imaging devices 1.

As illustrated, the imaging device 1 includes an imaging unit 11, an image processing unit 12, a control unit 13, a motion detection unit 14, a position detection unit 15, an azimuth detection unit 16, a communication unit 17, and a bus 18.

The imaging unit 11 includes an optical system including lenses such as a cover lens, a zoom lens, and a focus lens, a shutter, a diaphragm mechanism, and the like, and an imaging element that receives light from a subject incident through the optical system, such as a complementary metal oxide semiconductor (CMOS) type or a charge coupled device (CCD) type imaging element, for example.

The imaging unit 11 performs, for example, correlated double sampling (CDS) processing, automatic gain control (AGC) processing, or the like on an electric signal obtained by photoelectrically converting the light received by the imaging element, and further performs analog/digital (A/D) conversion processing. A captured image signal as digital data (hereinafter also referred to as "captured image data") is then output to the image processing unit 12 in the subsequent stage.

The image processing unit 12 is configured as an image processing processor by, for example, a digital signal processor (DSP) or the like, and performs various types of signal processing on the digital signal (captured image signal) from the imaging unit 11. For example, the image processing unit 12 performs signal processing such as white balance adjustment processing, color correction processing, gamma correction processing, Y/C conversion processing, or auto exposure (AE) processing.

The control unit 13 includes a microcomputer including a central processing unit (CPU), a read only memory (ROM), and a random access memory (RAM), and performs overall control of the imaging device 1 by executing processing according to a program stored in the ROM, for example.

The control unit 13 is connected to the imaging unit 11, the image processing unit 12, and the communication unit 17 via the bus 18, and can perform mutual data communication with these units via the bus 18.

The motion detection unit 14, the position detection unit 15, and the azimuth detection unit 16 are connected to the control unit 13. The motion detection unit 14 detects information indicating the motion of the imaging device 1, such as acceleration and angular velocity acting on the imaging device 1. The motion detection unit 14 in the present example includes an acceleration sensor and a gyro sensor as sensors for detecting the motion of the imaging device 1.

The position detection unit 15 detects the current position of the imaging device 1, and includes a global navigation satellite system (GNSS) sensor in the present example. Note that the method of detecting the current position is not limited to a method using a satellite.

The azimuth detection unit 16 detects an azimuth in which the imaging device 1 is oriented, and includes an azimuth sensor (geomagnetic sensor) in the present example.

The communication unit 17 performs data communication with an external device. The communication unit 17 in the present example is configured to perform data communication with the recording device 2 connected by wire, but the communication unit 17 may be configured to be capable of performing wireless communication with an external device.

The control unit 13 acquires, as imaging-related information, detection information detected by the motion detection unit 14, the position detection unit 15, and the azimuth detection unit 16 described above.

Furthermore, the control unit 13 in the present example acquires information regarding the focal length of the optical system from the imaging unit 11 as imaging-related information.

The control unit 13 performs processing of adding the acquired imaging-related information as metadata of the captured image data (moving image data) obtained through the processing of the image processing unit 12, and outputting the metadata together with the captured image data to the recording device 2 via the communication unit 17.

Figure 3:
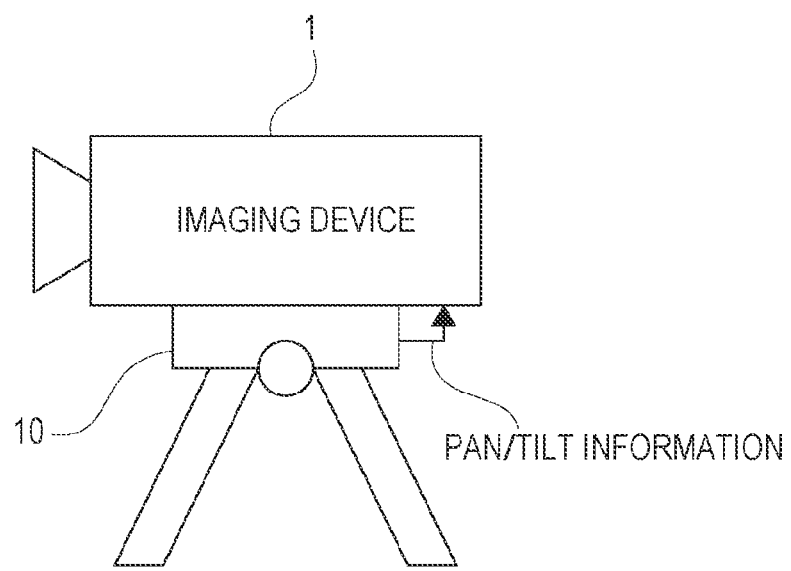
FIG. 3 is an explanatory diagram of a fixing device according to the embodiment.

Here, there is a case where the imaging device 1 is used by being attached (connected) to a tripod device 10 as illustrated in FIG. 3. The tripod device 10 is configured to be capable of performing angle adjustment (rotation angle adjustment) in the pan direction and the tilt direction.

The tripod device 10 may include a pan/tilt sensor that detects the angle in the pan direction and the angle in the tilt direction. This pan/tilt sensor can be referred to as a sensor that detects the orientation in each of the pan direction and the tilt direction of the attached imaging device 1.

Note that the tripod device 10 is an example of a "fixing device" in the present technology. The "fixing device" means a device that fixes an imaging device in a broad sense, and means a device that fixes an imaging device rotatably at least in the pan direction in a narrow sense. As a configuration of the fixing device, a configuration having less than three legs or four or more legs may be adopted, or a configuration may be adopted in which a camera platform device is attached to a leg portion and an imaging device is attached onto the camera platform device.

In a case where the imaging device 1 is attached to the tripod device 10 including the pan/tilt sensor, the control unit 13 acquires detection information detected by the pan/tilt sensor, that is, pan information indicating the orientation of the imaging device 1 in the pan direction and tilt information indicating the orientation of the imaging device 1 in the tilt direction (hereinafter, these will be collectively referred to as "pan/tilt information") as imaging-related information.

The control unit 13 also performs processing of outputting, as metadata of the captured image data, the imaging-related information as the pan/tilt information acquired from the tripod device 10 as described above to the recording device 2 via the communication unit 17.

[1-3. Configuration of Information Processing Device]

Figure 4:
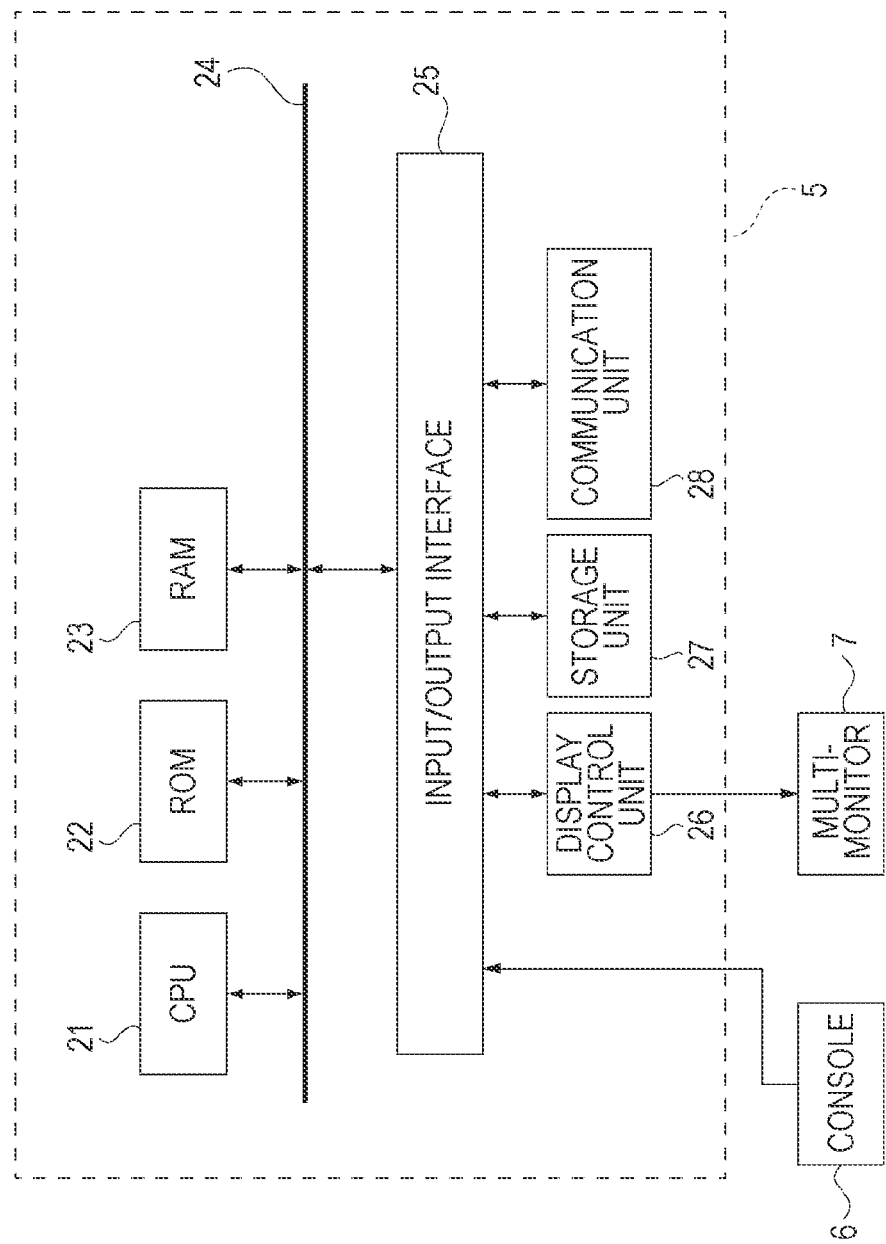
FIG. 4 is a block illustrating an internal configuration example of an information processing device according to the embodiment.

FIG. 4 is a block diagram for describing an internal configuration example of the information processing device 5. Note that FIG. 4 also illustrates the console 6 and the multi-monitor 7 illustrated in FIG. 1 together with the internal configuration example of the information processing device 5.

As illustrated, the information processing device 5 includes a CPU 21, a ROM 22, a RAM 23, a bus 24, an input/output interface 25, a display control unit 26, a storage unit 27, and a communication unit 28.

The CPU 21, the ROM 22, and the RAM 23 are connected to each other via the bus 24. The input/output interface 25 is also connected to the bus 24. The CPU 21 executes various types of processing according to a program stored in the ROM 22 or a program loaded from the storage unit 27 into the RAM 23. The RAM 23 also appropriately stores data and the like necessary for the CPU 21 to execute various types of processing.

The console 6 illustrated in FIG. 1, the display control unit 26, the storage unit 27, and the communication unit 28 are connected to the input/output interface 25.

Operation input information from the console 6 is supplied to the CPU 21 via the input/output interface 25.

The display control unit 26 performs display control of the multi-monitor 7 on the basis of an instruction from the CPU 21.

The storage unit 27 is a storage device including an HDD, a flash memory device, or the like.

The communication unit 28 is a communication device for performing data communication with the switcher 3.

The CPU 21 instructs the display control unit 26 to cause the multi-monitor 7 to display each captured image input from the switcher 3 via the communication unit 28.

Furthermore, the CPU 21 can instruct the display control unit 26 to cause the multi-monitor 7 to display information other than the captured images.

Figure 5:
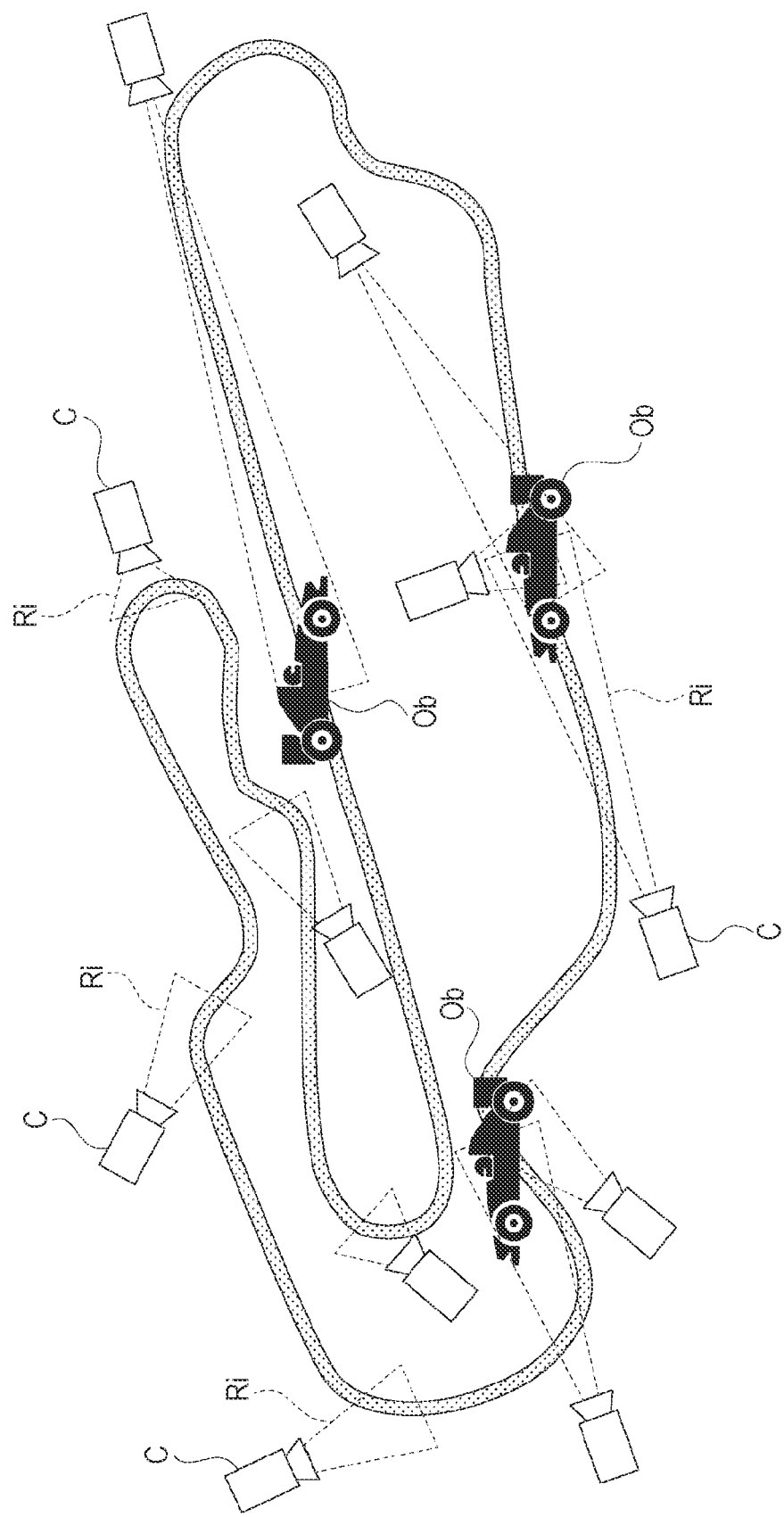
FIG. 5 is an explanatory diagram of an imaging state map according to the embodiment.

As illustrated in FIG. 5, the CPU 21 in the present example causes the multi-monitor 7 to display an imaging state map on which the imaging state of each of the imaging devices 1 is shown.

The imaging state map illustrated in FIG. 5 exemplifies an imaging state map used for sports broadcasting, specifically, broadcasting of a racing competition of automobiles. Icons of objects Ob to be imaged, camera icons C indicating the positions and orientations of the imaging devices 1, and icons indicating imaging ranges Ri of the imaging devices 1 are displayed on the map representing a running course of the automobiles (for example, a course of a circuit). Each of the icons of the imaging ranges Ri indicates the length of the focal length by the length of the icon.

The CPU 21 makes an instruction to generate and display such an imaging state map on the basis of imaging-related information added as metadata to captured image data. Specifically, the CPU 21 determines the positions and orientations of the camera icons C on the map on the basis of the position information of the imaging devices 1 and the information indicating the orientations of the imaging devices 1 (azimuth information or pan/tilt information) included in the imaging-related information, determines the lengths of the icons of the imaging ranges Ri on the basis of the information regarding the focal lengths of the imaging devices 1 included in the imaging-related information, performs processing of generating an image as the imaging state map as illustrated in FIG. 5, and performs processing of causing the multi-monitor 7 to display the generated image (instructing the display control unit 26 to perform display).

Displaying an image indicating the imaging states such as the positions, orientations, and focal lengths of the cameras as on the imaging state map illustrated in FIG. 5 makes it possible to allow the user as the operator to intuitively understand which camera captured image should be selected, and to reduce a work load related to the selection of a captured image.

Furthermore, displaying the icons of the objects Ob together with the camera icons C and the icons of the imaging ranges Ri makes it possible to facilitate discrimination between a camera that is capturing a subject to be imaged and a camera that is not capturing the subject to be imaged, and to facilitate prediction of a camera that will capture the subject to be imaged later, which makes it possible to more easily determine which camera captured image should be selected.

2. Processing as Embodiment

[2-1. Output Control of Imaging-Related Information]

Here, in order to display the imaging state map as described above, it is conceivable to constantly transmit imaging-related information from the side of each of the imaging devices 1, but in this case, the amount of communication data becomes enormous, and the memory capacity for storing the imaging-related information increases.

Therefore, in the present embodiment, a usage mode of the imaging device 1 is determined, and output control of the imaging-related information is performed on the basis of the determined usage mode.

Specifically, in the present example, as the determination of the usage mode of the imaging device 1, it is determined whether the usage mode of the imaging device 1 is a usage mode as a fixed camera, a usage mode as a handy camera, or a usage mode as a camera mounted on a mobile device. Here, the handy camera means the imaging device 1 in a state of being supported by a camera operator, such as being supported by a shoulder and a hand of the camera operator or only by a hand of the camera operator. Furthermore, the fixed camera means the imaging device 1 whose position is fixed, for example, by being attached to a fixing device such as a tripod. In particular, in the present example, the fixed camera means the imaging device 1 attached to the tripod device 10.

Furthermore, the mobile device means a movable device on which the imaging device 1 is mounted. Examples of the mobile device include a vehicle, a stand that moves on a rail, a device capable of flying such as a drone, and the like.

Here, in the case of the fixed camera, since the position of the fixed camera is not changed during broadcasting, it can be said that it is sufficient to output the position information only once for the first time. Alternatively, if the arrangement position is known, it is not necessary to output the position information of the fixed camera. On the other hand, as for the handy camera, since it is normal for a camera operator to hold the handy camera and walk around, it is desirable to frequently output the position information.

Therefore, in the present example, in a case where the imaging device is determined to be the fixed camera, the output frequency of the position information is reduced as compared with a case where the imaging device is determined to be the handy camera. As a result, it is possible to reduce the amount of communication data and the memory capacity while a function on the side of an application using the imaging-related information, specifically, the function of displaying the camera positions on the imaging state map in the present example is prevented from being impaired.

Furthermore, in the present example, in a case where the imaging device is determined to be the camera mounted on the mobile device, the output frequency of the position information is set higher than that in a case where the imaging device is determined to be the fixed camera and lower than that in a case where the imaging device is determined to be the handy camera.

For example, in the case of the camera mounted on the mobile device as a vehicle, a stand that moves on a rail, or the like, the movement direction can be predicted to some extent as compared with the case of the handy camera, and thus there is a case where the function on the application side is not impaired even if the position information is not frequently output as in the case of the handy camera.

Therefore, controlling the output frequency as described above makes it possible to reduce the amount of communication data and the memory capacity while the function on the application side is prevented from being impaired.

In the present example, in a case where the imaging device 1 is determined to be the camera mounted on the mobile device, speed information of the imaging device 1 is output as imaging-related information. Note that the speed information of the imaging device 1 can be obtained by time differentiation of the position detected by the position detection unit 15 or time integration of the acceleration detected by the motion detection unit 14.

For example, in the case of the camera mounted on the mobile device as a vehicle, a stand that moves on a rail, or the like, the movement direction can be predicted to some extent as compared with the case of the handy camera, and thus, the position can be predicted on the basis of the speed information.

Therefore, for the camera mounted on the mobile device, it is possible to suppress a decrease in the estimation accuracy of the camera position on the application side in a case where the output frequency of the position information is reduced, and it is possible to prevent the function of the application from being impaired.

Figure 6:
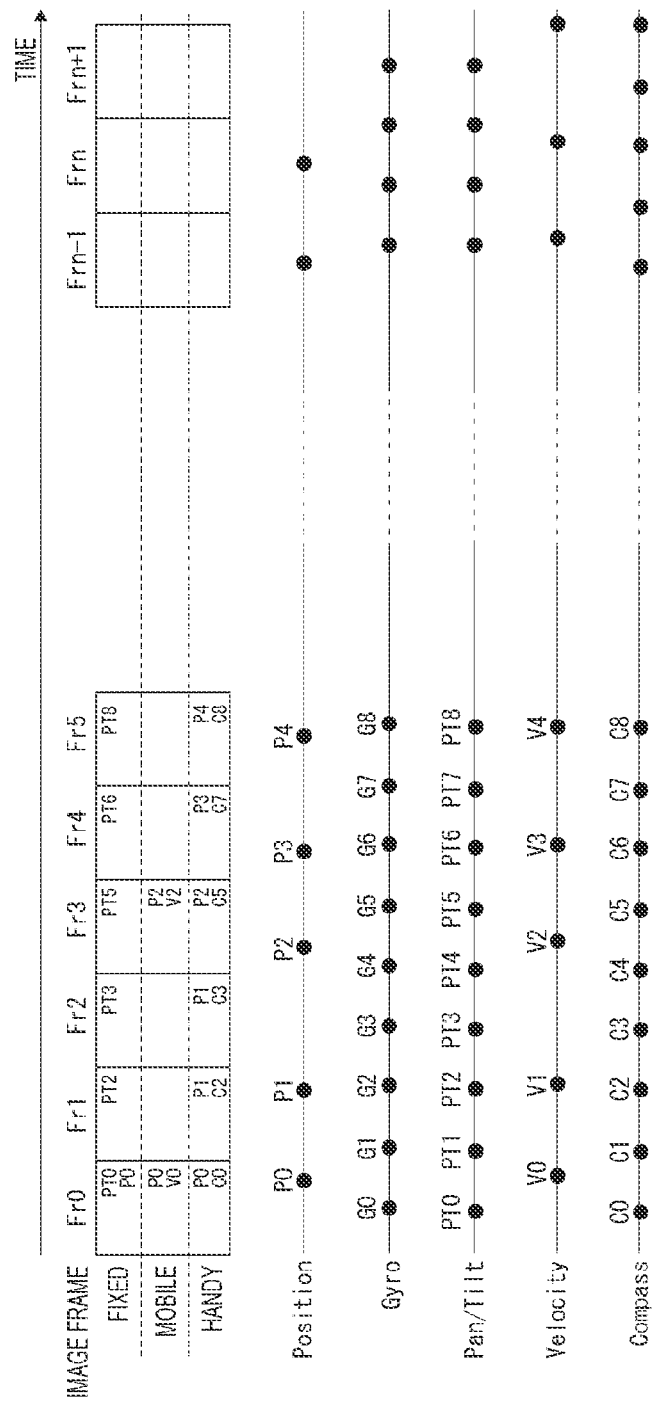
FIG. 6 is a diagram for describing an example of an output frequency of imaging-related information.

FIG. 6 is a diagram for describing an example of the output frequency of the imaging-related information.

In the present example, the imaging-related information is output as metadata that can be added for each frame of captured image data.

In the case of the fixed camera, the position information ("Position" in the drawing) is not output after being output ("P0") in the first frame ("Fr0" in the drawing). In the case of the camera mounted on the mobile device ("mobile" in the drawing), the position information is output at a frequency of once in a plurality of frames (a frequency of once in three frames in the drawing), and in the case of the handy camera, the position information is output for each frame.

In the present example, the pan/tilt information ("PTx" in the drawing) in the case of the fixed camera is output for each frame.

Here, the tripod device 10 may not include the pan/tilt sensor in some cases. In the present example, in a case where the pan/tilt information cannot be acquired from the tripod device 10, azimuth information detected by the azimuth detection unit 16 is output instead of the pan/tilt information (this point will be described later).

Furthermore, in the present example, for the camera mounted on the mobile device, the speed information is output at the same frequency as the position information. Note that this is merely an example, and it is not essential to output the speed information at the same frequency as the position information.

In the case of the handy camera, the azimuth information ("Cx" in the drawing) is output at the same frequency as the position information. Note that this point is not essential, and the position information and the azimuth information can be output at different frequencies.

For the position information, the pan/tilt information, the speed information, and the azimuth information, the most recently acquired values are output.

Note that, as described above, in the present example, the information regarding the focal length is also output as imaging-related information. In the present example, since the information regarding the focal length is output for each frame regardless of the usage mode of the imaging device 1, illustration thereof is omitted in FIG. 6.

In the drawing, detection values detected by the gyro sensor are exemplified ("Gx" in the drawing), and in the present example, the detection values detected by the gyro sensor are used to determine whether or not the imaging device is the handy camera, as described later.

Here, as illustrated in FIG. 6, in the present example, the imaging-related information is output as metadata of a captured image, and as a result, it is not necessary to perform time synchronization between the captured image and the metadata in the subsequent processing, which makes it possible to prompt the operator to make a determination in real time.

Figure 7:
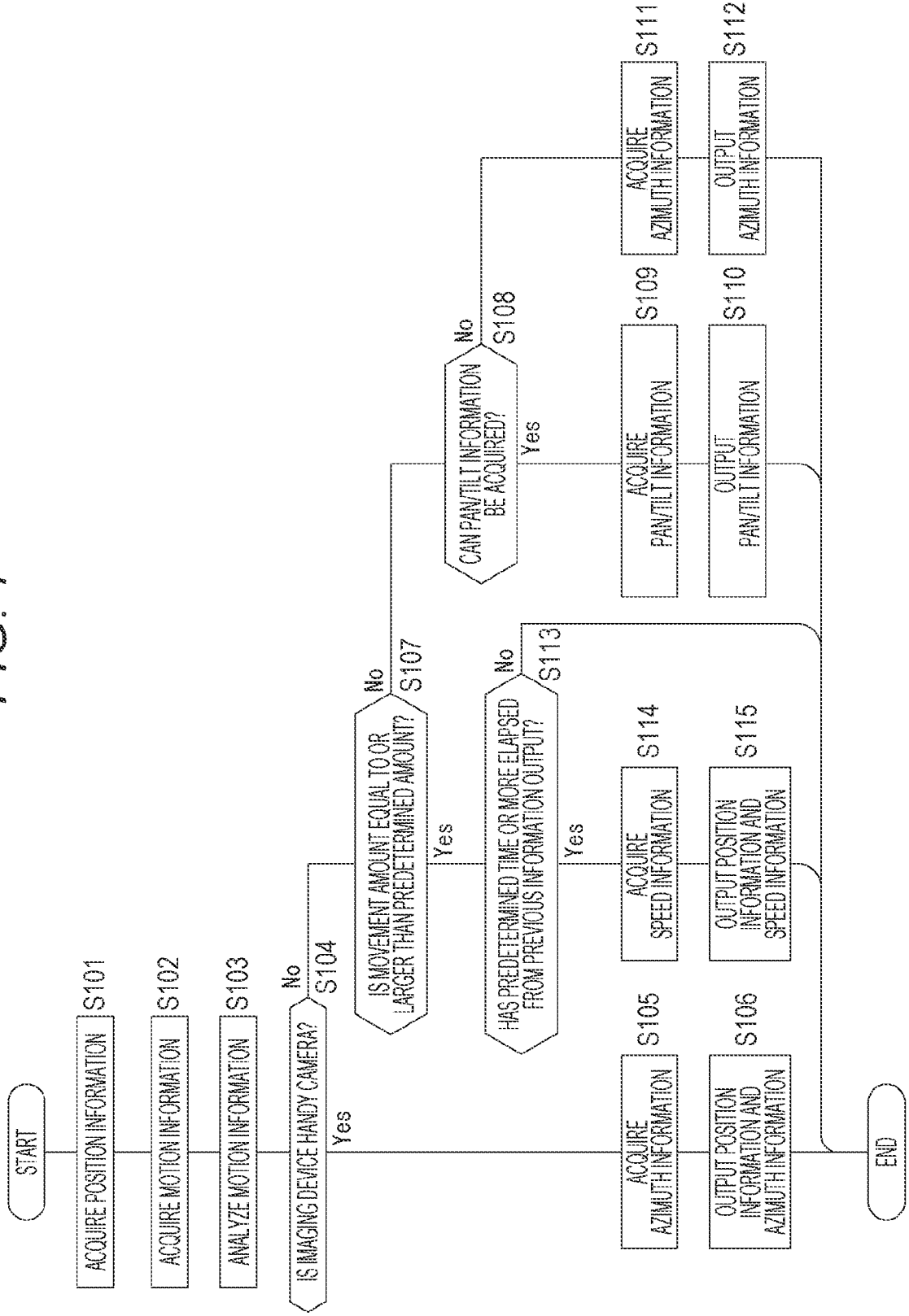
FIG. 7 is a flowchart illustrating a specific processing procedure for implementing output control of the imaging-related information as an embodiment.

FIG. 7 is a flowchart illustrating a specific processing procedure for implementing the output control of the imaging-related information as the embodiment described above. The processing illustrated in FIG. 7 is repeatedly executed by the control unit 13 in the imaging device 1 in a frame cycle of a captured image.

Note that the arrangement position of a fixed camera is known in most cases, and if the position information indicating the known arrangement position is set as the position information of the fixed camera to the information processing device 5, it is not necessary to add the position information to the first frame as described above. Therefore, FIG. 7 (and also including FIG. 8 to be described later) illustrates processing in a case where no position information is output in the case of the fixed camera.

Furthermore, in the present example, as described above, the information regarding the focal length is only required to be output for each frame regardless of the usage mode of the imaging device 1, and thus FIG. 7 (and FIG. 8) does not illustrate processing related to the output of the focal length.

First, the control unit 13 performs processing of acquiring position information detected by the position detection unit 15 as position information acquisition processing in step S101, and performs processing of acquiring acceleration and angular velocity detected by the acceleration sensor and the gyro sensor in the motion detection unit 14 as motion information acquisition processing in subsequent step S102.

The control unit 13 then performs processing of analyzing the motion information in subsequent step S103. Specifically, waveform analysis is performed on the acceleration and the angular velocity by use of Fourier transform or the like, so that the vibration width and the vibration cycle are analyzed.

In step S104 following step S103, the control unit 13 determines whether or not the imaging device is a handy camera on the basis of the analysis result in step S103. Note that, in determining whether or not the imaging device is the handy camera, waveform analysis is only required to be performed on at least one of the acceleration or the angular velocity.

In a case where it is determined in step S104 that the imaging device is the handy camera, the control unit 13 proceeds to step S105 to perform processing of acquiring azimuth information, that is, processing of acquiring azimuth information detected by the azimuth detection unit 16, performs processing of outputting the position information and the azimuth information in subsequent step S106, and ends the series of processing illustrated in FIG. 7.

With such processing, in the case of the handy camera, the position information and the azimuth information are output for each frame.

On the other hand, in a case where it is determined in step S104 that the imaging device is not the handy camera, the control unit 13 proceeds to step S107 to determine whether or not the movement amount is equal to or larger than a predetermined amount. That is, it is determined whether or not the movement amount obtained from the most recently acquired position information as the position information acquired by the position detection unit 15 and position information acquired before the most recently acquired position information (for example, position information right before the most recent position information) is equal to or larger than the predetermined amount. If the movement amount is smaller than the predetermined amount, it can be determined that the imaging device is the fixed camera, and if the movement amount is equal to or larger than the predetermined amount, it can be determined that the imaging device is a camera mounted on a mobile device.

In a case where it is determined that the movement amount is not equal to or larger than the predetermined amount, the control unit 13 advances the processing to step S108 to execute processing corresponding to the case of the fixed camera.

First, in step S108, the control unit 13 determines whether or not pan/tilt information can be acquired. For example, it is determined whether or not there is a signal input indicating the pan/tilt information from the tripod device 10. Alternatively, in a system in which it is guaranteed that each of a plurality of tripod devices 10 includes the pan/tilt sensor, in a case where there is a switch that detects whether or not the imaging device is in a state of being attached to the tripod device 10, it is also possible to determine whether or not the pan/tilt information can be acquired on the basis of the on/off state of the switch.

In a case where it is determined in step S108 that the pan/tilt information can be acquired, the control unit 13 proceeds to step S109 to acquire the pan/tilt information from the tripod device 10, then performs processing of outputting the pan/tilt information in step S110, and ends the series of processing illustrated in FIG. 7.

On the other hand, in a case where it is determined that the pan/tilt information cannot be acquired, the control unit 13 proceeds to step S111 to acquire the azimuth information from the azimuth detection unit 16, then performs processing of outputting the azimuth information in step S112, and ends the series of processing illustrated in FIG. 7.

As described above, in a case where it is determined that the imaging device is the fixed camera, the pan/tilt information is output for each frame if the pan/tilt information can be acquired, and the azimuth information is output for each frame if the pan/tilt information cannot be acquired.

Furthermore, in a case where it is determined that the movement amount is equal to or larger than the predetermined amount in step S107 described above, the control unit 13 proceeds to step S113 to determine whether or not a predetermined time or more has elapsed from the previous information output. For example, as illustrated in FIG. 6, in a case where information output is performed every three frames for the camera mounted on the mobile device, it is determined whether or not a time corresponding to two frames or more has elapsed from the previous information output.

If the predetermined time or more has not elapsed from the previous information output, the control unit 13 ends the series of processing illustrated in FIG. 7.

On the other hand, if the predetermined time or more has elapsed from the previous information output, the control unit 13 proceeds to step S114 to acquire speed information, then performs processing of outputting the position information and the speed information in step S115, and ends the series of processing illustrated in FIG. 7.

As described above, for the camera mounted on the mobile device, the position information and the speed information are output at a frequency of once in a plurality of frames.

Note that it is conceivable that there are individual variations depending on mounted sensors such as gyro sensors, but holding values indicating such variations in the cameras in advance makes it possible to omit complicated operations such as calibration on site. If calibration data for each sensor is held in advance even if each sensor is not a visceral sensor, it is also possible to accurately handle sensor values in the cameras.

As described above, the control unit 13 determines whether the imaging device 1 corresponds to the handy camera, the fixed camera, or the camera mounted on the mobile device. However, it is also possible to output information indicating the determination result (for example, flag information) as imaging-related information together with captured image data.

As a result, on the side of the information processing device 5, it is possible to display, on the multi-monitor 7, the information indicating whether each of the imaging devices 1 corresponds to the handy camera, the fixed camera, or the camera mounted on the mobile device.

Note that the determination as to whether or not the imaging device is the fixed camera can also be made by determination on connection to the tripod device 10.

Figure 8:
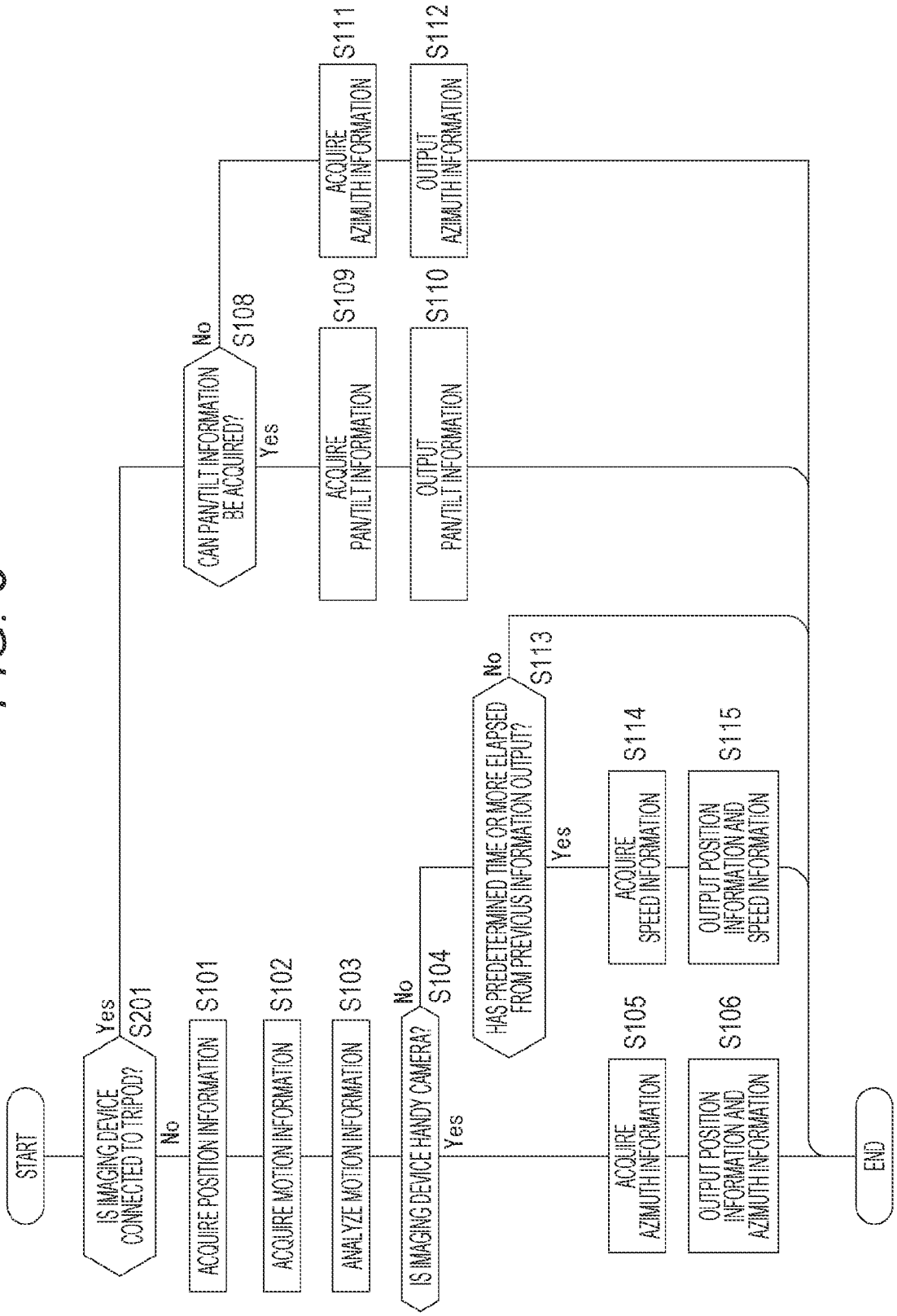
FIG. 8 is a flowchart illustrating a processing procedure in a case where determination as to whether or not the imaging device is a fixed camera is made by determination on connection to a fixing device.

The flowchart of FIG. 8 illustrates a processing example in this case. Note that, in the following description, parts similar to the already described parts will be denoted by the same reference signs and the same step numbers, and description thereof will be omitted.

In FIG. 8, the control unit 13 in this case first determines in step S201 whether or not the imaging device is connected to a tripod. In a system in which it is guaranteed that each of a plurality of tripod devices 10 includes the pan/tilt sensor, this determination can be made as determination as to whether or not there is a signal input indicating pan/tilt information from the tripod device 10. Alternatively, in a case where there is a switch that detects whether or not the imaging device is in a state of being attached to the tripod device 10, the determination processing can be performed as processing of determining the on/off state of the switch.

In a case where it is determined that the imaging device is connected to the tripod, the control unit 13 advances the processing to step S108. Note that the processing from step S108 to step S112 is similar to the processing for the fixed camera described with reference to FIG. 7, and thus duplicate description will be avoided.

On the other hand, in a case where it is determined that the imaging device is not connected to the tripod, the control unit 13 advances the processing to step S101. The processing of steps S101 to S106 has been already described with reference to FIG. 7, and thus duplicate description will be avoided.

In this case, in a case where it is determined in step S104 that the imaging device is not the handy camera, it can be determined that the imaging device is the camera mounted on the mobile device, and thus the processing proceeds to step S113 as illustrated in the drawing. That is, the processing corresponding to the camera mounted on the mobile device described with reference to FIG. 7 is executed.

Since the determination as to whether or not the imaging device is the fixed camera is made by determination on connection to the tripod device 10 as described above, it is not necessary to acquire the motion information of the imaging device 1 or perform analysis processing such as waveform analysis on the motion information in determining whether or not the imaging device is the fixed camera.

Therefore, it is possible to reduce a processing load in determining the usage mode.

[2-2. Notification Display]

It can be estimated that a handy camera that has stopped after movement is a camera that has moved to a position near a subject to be imaged and is preparing for an interview or the like or has completed the preparation.

Therefore, in the present embodiment, it is determined whether or not the imaging device 1 as a handy camera has stopped after movement, and display processing of making notification of the imaging device 1 determined to have stopped after movement is performed on the basis of a result of the determination. Specifically, for example, on the imaging state map illustrated in FIG. 5, display processing for highlighting (emphasizing) the concerned imaging device 1 is performed. The display processing includes, for example, displaying the camera icon C and/or the icon of the imaging range Ri for the concerned imaging device 1 in a blinking manner or in a specific color such as red.

Figure 9:
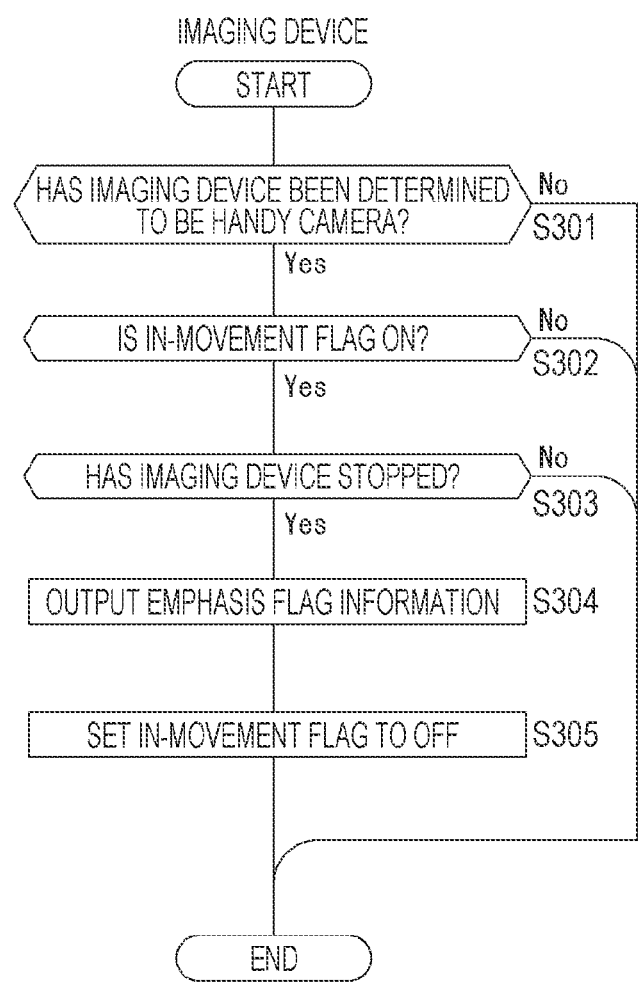
FIG. 9 is a flowchart illustrating a specific processing procedure to be executed on the side of the imaging device in order to implement notification display of a handy camera that has stopped after movement.

FIG. 9 is a flowchart illustrating a specific processing procedure to be executed by the control unit 13 of the imaging device 1 in order to implement such notification display.

Note that it is assumed that the control unit 13 executes the processing for the output control of the imaging-related information illustrated in FIG. 7 in parallel with the processing illustrated in FIG. 9.

First, in step S301, the control unit 13 determines whether or not the imaging device has been determined to be a handy camera, that is, whether or not the imaging device has been determined to be a handy camera in the processing illustrated in FIG. 7 (see step S104). In a case where it is determined that the imaging device has not been determined to be the handy camera, the control unit 13 ends the series of processing illustrated in FIG. 9. That is, in a case where the imaging device has not been determined to be the handy camera, processing for stop determination after movement described below is not executed.

On the other hand, in a case where it is determined that the imaging device has been determined to be the handy camera, the control unit 13 proceeds to step S302 to determine whether or not an in-movement flag is ON. The in-movement flag is a flag generated by the control unit 13 on the basis of the position information detected by the position detection unit 15, and indicates whether or not the imaging device 1 is moving. Specifically, ON indicates that the imaging device is moving, and OFF indicates that the imaging device is not moving.

If the in-movement flag is not ON, the control unit 13 ends the series of processing illustrated in FIG. 9.

If the in-movement flag is ON, the control unit 13 proceeds to step S303 to determine whether or not the imaging device has stopped. That is, it is determined whether or not the imaging device 1 has stopped on the basis of position information detected by the position detection unit 15.

In a case where it is determined that the imaging device 1 has not stopped, the control unit 13 ends the series of processing illustrated in FIG. 9.

In a case where it is determined that the imaging device 1 has stopped, the control unit 13 proceeds to step S304 to output emphasis flag information. That is, the flag information for making an instruction to emphatically display the imaging device 1 as the own device is added as metadata of captured image data, and is output by the communication unit 17.

As a result, in a case where it is determined that the imaging device 1 determined to be the handy camera has stopped after movement, it is possible to instruct the information processing device 5 to emphatically display the imaging device 1.

In step S305 following step S304, the control unit 13 sets the in-movement flag to OFF, and then ends the series of processing illustrated in FIG. 9.

In the case of receiving the emphasis flag information, the information processing device 5 executes display processing for emphatically displaying the imaging device 1 as an output source of the emphasis flag information on the multi-monitor 7 although the processing is not illustrated. Specifically, the information processing device 5 performs display processing for implementing emphasis display on the imaging state map as described above.

As a result, it is possible to notify the user as the operator of the imaging device 1 as the handy camera that has stopped after movement.

In the above description, an example has been described in which the determination as to whether or not the handy camera has stopped after movement is made on the side of the imaging device 1, but the determination can also be made on the side of the information processing device 5 on the basis of the imaging-related information output by the imaging device 1.

Figure 10:
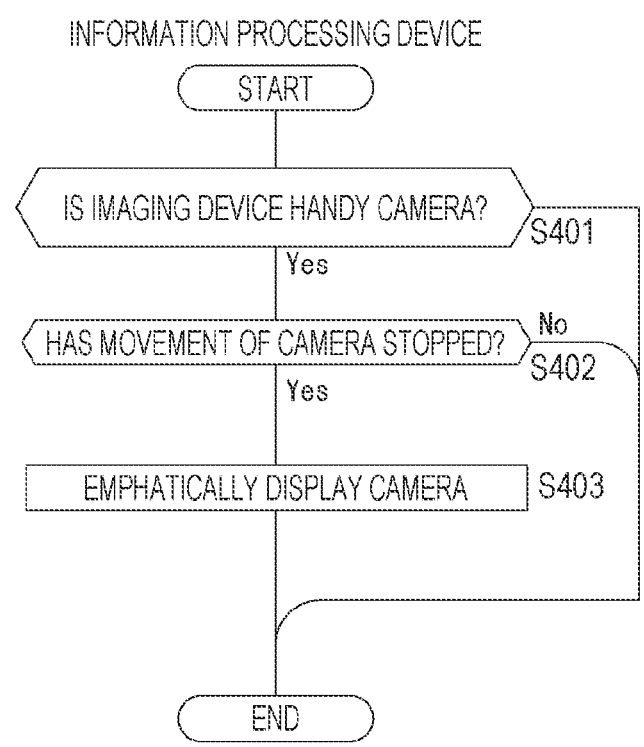
FIG. 10 is a flowchart illustrating a specific processing procedure in a case where determination as to whether or not the handy camera has stopped after movement is made on the side of the information processing device.

FIG. 10 is a flowchart illustrating a specific processing procedure to be executed by the CPU 21 of the information processing device 5 in this case.

First, in step S401, the CPU 21 determines whether or not the imaging device is a handy camera. As described above, in a case where the imaging device 1 outputs, as imaging-related information, information indicating a result of the determination as to whether the imaging device 1 is a handy camera, a fixed camera, or a camera mounted on a mobile device, this determination processing can be performed on the basis of the information indicating the result of the determination. Alternatively, in a case where the information indicating the result of the determination is not output as imaging-related information, the imaging device 1 is only required to output motion information detected by the motion detection unit 14 as imaging-related information, and perform determination processing based on the analysis result of the motion information.

In a case where it is determined that the imaging device is not the handy camera, the CPU 21 ends the series of processing illustrated in FIG. 10.

In a case where it is determined that the imaging device is the handy camera, the CPU 21 proceeds to step S402 to determine whether or not the movement of the camera has stopped. This determination processing can be performed by, for example, a method similar to the method described in steps S302 and S303 above on the basis of the position information output as imaging-related information from the imaging device 1.

In a case where it is determined that the movement of the camera has not stopped, the CPU 21 ends the series of processing illustrated in FIG. 10.

On the other hand, in a case where it is determined that the movement of the camera has stopped, the CPU 21 proceeds to step S403 to emphatically display the camera. That is, the CPU 21 performs display processing for emphatically displaying the concerned imaging device 1 on the multi-monitor 7.

The CPU 21 ends the series of processing illustrated in FIG. 10 in response to the execution of the processing of step S403.

Note that, in the above description, an example has been described in which the handy camera that has stopped after movement is emphatically displayed on the image indicating the positions and orientations of the imaging devices 1, which serves as the imaging state map, so that the user is notified of the handy camera. However, for example, in a case where captured images from the imaging devices 1 are simultaneously displayed on the multi-monitor 7, the captured image from the concerned handy camera may be emphatically displayed (for example, a frame is displayed on an edge of the image). Even in this case, the operator can grasp the concerned handy camera. That is, the display for notifying the operator of the handy camera that has stopped after movement is performed even in this case.

Here, in the above description, an example has been described in which the information processing device 5 that performs the display processing of information based on the imaging-related information inputs captured images from the imaging devices 1 via the switcher 3. However, as in an information processing system 100A illustrated in FIG. 11, it is also possible to adopt a configuration in which the captured images from the imaging devices 1 are directly input to the information processing device 5.

3. Modification

Here, in the above description, an example has been described in which the usage mode of the imaging device 1 is determined on the basis of the detection information of the sensors, but the determination of the usage mode of the imaging device 1 can also be made on the basis of plan information of the usage mode. In the broadcasting system, the plan information of the usage mode may be set for each of the imaging devices 1. In such a case, the usage mode can also be determined on the basis of information regarding the usage mode indicated in the plan information (in the present example, the plan information indicates distinction among a fixed camera, a handy camera, and a camera mounted on a mobile device).

Note that the determination of the usage mode can also be made on the basis of both the plan information and sensor information. For example, it is conceivable that the determination is made on the condition that the results of both the determination based on the plan information and the determination based on the sensor information match.

Furthermore, in the above description, an example has been described in which the position information is output together with the speed information for the camera mounted on the mobile device, but a configuration may be adopted in which the position information is not output. In this case, for the handy camera, the position information is output, and for the camera mounted on the mobile device, the position information is not output but the speed information is output.

Furthermore, for the camera mounted on the mobile device, the azimuth information may be output, or the pan/tilt information may be output if the pan/tilt information can be acquired.

Furthermore, in the above description, a case has been exemplified in which the operation of selecting a captured image to be output from the switcher 3 to the transmitter 4 (camera selection operation) is received as an operation on the console 6. However, in a case where the multi-monitor 7 includes a touch panel that detects a touch operation on a screen, the touch operation on the screen may be received as the camera selection operation. For example, it is conceivable to receive an operation of touching one of the camera icons C on the imaging state map as illustrated in FIG. 5 as the camera selection operation.

Furthermore, in the above description, an example has been described in which the imaging device 1 outputs a captured image to the recording device 2, but the captured image can also be output from the imaging device 1 to the recording device 2 via a camera control unit (CCU). In a case where such a configuration is adopted, the imaging-related information can also be output from the CCU to the recording device 2, and in this case, the CCU can also be configured to perform the output control of the imaging-related information. That is, the subject that executes the output control of the imaging-related information is not limited to the imaging device 1.

4. Summary of Embodiments

As described above, a control device (imaging device 1) as an embodiment includes: a determination unit (control unit 13: see steps S104, S107, S201, and the like) that determines a usage mode of an imaging device; and a control unit (control unit 13: see processing in and after step S104 in FIG. 7 and processing in and after step S108 and processing in and after step S104 in FIG. 8) that performs output control of imaging-related information related to the imaging device on the basis of the usage mode determined by the determination unit.

As described above, the imaging-related information means information related to imaging. For example, the imaging-related information can include information indicating the position of the imaging device (corresponding to the position of the imaging viewpoint), information regarding the focal length, information indicating the imaging direction, information indicating the motion of the imaging device, such as acceleration and angular velocity acting on the imaging device, information regarding the moving speed of the imaging device, and the like. Furthermore, examples of the usage mode of the imaging device include usage modes as a fixed camera, a handy camera, a camera mounted on a mobile device, and the like. Performing the output control of the imaging-related information on the basis of the usage mode of the imaging device as described above makes it possible to perform control so as not to output unnecessary information according to the usage mode of the camera. For example, in the case of the fixed camera that does not move, the imaging-related information as the position information of the camera is not output, and in the case of the handy camera that is assumed to move, the imaging-related information as the position information of the camera is output. Alternatively, the type of the imaging-related information to be output can be changed according to the usage mode of the camera.

Therefore, it is possible to output the imaging-related information in an appropriate manner. For example, it is possible to output the imaging-related information so as to reduce the amount of communication data and reduce the memory capacity used for information storage, or output an appropriate type of information according to the usage mode of the imaging device.

Furthermore, in the control device as the embodiment, the determination unit makes at least determination as to whether the usage mode of the imaging device is a usage mode as a fixed camera or a usage mode as a handy camera, as the determination of the usage mode.

For example, in a case where the position information of the imaging device is output as the imaging-related information, the fixed camera has a fixed position, and thus basically does not need to output the position information. On the other hand, the handy camera is likely to move by being held by a camera operator, the position of the handy camera should be checked at a high frequency, and thus it is required to increase the output frequency of the position information. As described above, for the fixed camera and the handy camera, there is a case where an output mode of specific imaging-related information should be changed.

Therefore, determining whether the imaging device is the fixed camera or the handy camera as described above makes it possible to perform appropriate output control according to the usage mode of the imaging device as the output control of the imaging-related information.

Moreover, in the control device as the embodiment, the determination unit determines whether the usage mode of the imaging device is the usage mode as the fixed camera, the usage mode as the handy camera, or a usage mode as a camera mounted on a mobile device.

With this configuration, it is determined whether the usage mode of the camera whose position is not fixed is the usage mode as the handy camera or the usage mode as the camera mounted on the mobile device.

Therefore, it is possible to appropriately distinguish camera usage modes in correspondence with a case where the output mode of the imaging-related information should be changed between the handy camera and the camera mounted on the mobile device.

Furthermore, in the control device as the embodiment, the control unit reduces an output frequency of the imaging-related information in a case where the determination unit determines that the imaging device is the fixed camera as compared with a case where the determination unit determines that the imaging device is the handy camera.

For the fixed camera, even if the output frequency of the imaging-related information is reduced, a function on the side of an application using the imaging-related information may not be impaired, and thus, for example, in the case of the fixed camera, it is possible to omit the output of the position information.

Therefore, as described above, reducing the output frequency of the imaging-related information in the case of the fixed camera as compared with the case of the handy camera makes it possible to reduce the amount of communication data and the memory capacity while the function on the side of the application using the imaging-related information is prevented from being impaired.

Furthermore, in the control device as the embodiment, in a case where the determination unit determines that the imaging device is the camera mounted on the mobile device, the control unit sets an output frequency of the imaging-related information higher than an output frequency of the imaging-related information in a case where the imaging device is determined to be the fixed camera and lower than an output frequency of the imaging-related information in a case where the imaging device is determined to be the handy camera.

For example, in the case of the camera mounted on the mobile device as a vehicle, a stand that moves on a rail, or the like, the movement direction can be predicted to some extent as compared with the case of the handy camera, and thus there is a case where the function on the side of the application using the imaging-related information is not impaired even if the imaging-related information is not frequently output as in the case of the handy camera.

Therefore, controlling the output frequency as described above makes it possible to reduce the amount of communication data and the memory capacity while the function on the side of the application using the imaging-related information is prevented from being impaired.

Furthermore, in the control device as the embodiment, the determination unit determines the usage mode on the basis of detection information of a sensor.

For example, the usage mode of the camera is determined on the basis of detection information of a motion sensor that detects the motion of the imaging device, such as an acceleration sensor or an angular velocity sensor, a position sensor that detects the position of the imaging device, or the like.

Since the sensor can actually detect the state of the imaging device such as the motion or position of the imaging device to determine the usage mode, the determination accuracy can be improved.

Furthermore, in the control device as the embodiment, the determination unit determines the usage mode on the basis of detection information of a motion sensor that detects a motion of the imaging device.

The usage mode is determined on the basis of detection information of the motion sensor that detects the motion of the imaging device, such as an acceleration sensor or an angular velocity sensor, for example. As a result, it is possible to detect characteristics of motion specific to the handy camera, such as motion of the camera due to camera shake, for example.

Therefore, the motion sensor is suitable for determining whether or not the usage mode of the imaging device is the usage mode as the handy camera.

Furthermore, in the control device as the embodiment, the determination unit determines the usage mode on the basis of detection information of a position sensor that detects a position of the imaging device.

This configuration makes it possible to determine the usage mode on the basis of a change mode of the camera position.

Therefore, the position sensor is suitable for determining whether or not the usage mode of the imaging device is the usage mode as the fixed camera or whether or not the imaging device is the camera mounted on the mobile device.

Moreover, in the control device as the embodiment, the imaging-related information includes position information of the imaging device.

This configuration makes it possible to output the position information as the imaging-related information, and it is possible to implement, as the application using the imaging-related information, an application that shows a user such as an operator the camera position, for example, on a map or the like.

Therefore, it is possible to implement a highly convenient application capable of allowing the user to intuitively understand which camera captured image should be selected.

Furthermore, in the control device as the embodiment, the control unit changes a type of the imaging-related information to be output on the basis of a result of the determination by the determination unit.

This configuration makes it possible to output an appropriate type of imaging-related information according to the usage mode of the camera.

Therefore, it is possible to implement a highly convenient application that presents appropriate information according to the usage mode of the camera to the user, which serves as the application using the imaging-related information.

Furthermore, in the control device as the embodiment, the determination unit makes at least determination as to whether or not the usage mode of the imaging device is a usage mode as a camera mounted on a mobile device, as the determination of the usage mode, and the control unit performs processing of outputting speed information of the imaging device as the imaging-related information in a case where the determination unit determines that the imaging device is the camera mounted on the mobile device.

For example, in the case of the camera mounted on the mobile device as a vehicle, a stand that moves on a rail, or the like, the movement direction can be predicted to some extent as compared with the case of the handy camera, and thus, the position can be predicted on the basis of the speed information.

Therefore, for the camera mounted on the mobile device, it is possible to suppress a decrease in the estimation accuracy of the camera position on the application side in a case where the output frequency of the position information is reduced, and it is possible to prevent the function of the application from being impaired.

Moreover, in the control device as the embodiment, the control unit performs processing of outputting pan information of the imaging device as the imaging-related information in a case where the pan information can be acquired from a fixing device that fixes the imaging device rotatably at least in a pan direction, and performs processing of outputting azimuth information detected by an azimuth sensor that detects an azimuth of the imaging device as the imaging-related information in a case where the pan information cannot be acquired from the fixing device.

With this configuration, in a case where the pan information cannot be acquired, the azimuth information as alternative information of the pan information is output.

Therefore, even in a case where the pan information cannot be acquired, it is possible to implement an application that shows the user the camera orientation, for example, on the map or the like, which serves as the application using the imaging-related information, and it is possible to improve convenience.

Furthermore, in the control device as the embodiment, the determination unit determines whether or not the usage mode of the imaging device is the usage mode as the fixed camera by determining connection of the imaging device to a fixing device that fixes the imaging device.

With this configuration, it is not necessary to acquire motion information of the imaging device or perform analysis processing such as waveform analysis on the motion information in determining whether or not the imaging device is the fixed camera.

Therefore, it is possible to reduce a processing load in determining the usage mode.

Furthermore, in the control device as the embodiment, the determination unit determines the usage mode on the basis of plan information of the usage mode set for each of a plurality of the imaging devices.

With this configuration, it is not necessary to acquire the motion information or the position information of the imaging device or to perform the analysis processing on the motion information or the position information in determining the usage mode.

Therefore, it is possible to reduce the processing load in determining the usage mode.

A control method as an embodiment is a control method including: determining a usage mode of an imaging device; and performing output control of imaging-related information related to the imaging device on the basis of the determined usage mode.

Even with the control method as such an embodiment, it is possible to obtain actions and effects similar to those of the control device as the above-described embodiment.

An information processing system according to an embodiment includes: a control device (imaging device 1) including a determination unit that determines a usage mode of an imaging device, and a control unit that performs output control of imaging-related information related to the imaging device on the basis of the usage mode determined by the determination unit; and an information processing device (information processing device 5) including a display processing unit (CPU 21) that performs display processing of information based on the imaging-related information output by the output control of the control unit.

Even with the information processing system as such an embodiment, it is possible to obtain actions and effects similar to those of the control device as the above-described embodiment.

Furthermore, the information processing system as the embodiment includes a stop determination unit (control unit 13 or CPU 21: see FIGS. 9 and 10) that determines whether or not the imaging device has stopped after movement, and the display processing unit performs display processing of making notification of the imaging device determined to have stopped after movement by the stop determination unit.

The imaging device that has stopped after movement can be estimated to be an imaging device that has moved to a position near a subject to be imaged and is preparing for an interview or the like or has completed the preparation.

Therefore, performing the display processing of making notification of the imaging device that has stopped after movement as described above makes it possible to implement a highly convenient application capable of allowing the user to intuitively understand which camera captured image should be selected.

Note that the effects described in the present description are merely examples and are not limited, and another effect may be provided.

5. Present Technology

Note that the present technology can also adopt the following configurations.

(1)

A control device including:

a determination unit that determines a usage mode of an imaging device; and a control unit that performs output control of imaging-related information related to the imaging device on the basis of the usage mode determined by the determination unit.

(2)
The control device according to (1),
in which the determination unit
makes at least determination as to whether the usage mode of the imaging device is a usage mode as a fixed camera or a usage mode as a handy camera, as the determination of the usage mode.

(3)
The control device according to (2),
in which the determination unit
determines whether the usage mode of the imaging device is the usage mode as the fixed camera, the usage mode as the handy camera, or a usage mode as a camera mounted on a mobile device.

(4)
The control device according to (2) or (3),
in which the control unit
reduces an output frequency of the imaging-related information in a case where the determination unit determines that the imaging device is the fixed camera as compared with a case where the determination unit determines that the imaging device is the handy camera.

(5)
The control device according to (3),
in which in a case where the determination unit determines that the imaging device is the camera mounted on the mobile device, the control unit sets an output frequency of the imaging-related information higher than an output frequency of the imaging-related information in a case where the imaging device is determined to be the fixed camera and lower than an output frequency of the imaging-related information in a case where the imaging device is determined to be the handy camera.

(6)
The control device according to any one of (1) to (5),
in which the determination unit
determines the usage mode on the basis of detection information of a sensor.

(7)
The control device according to (6),
in which the determination unit
determines the usage mode on the basis of detection information of a motion sensor that detects a motion of the imaging device.

(8)
The control device according to (6) or (7),
in which the determination unit
determines the usage mode on the basis of detection information of a position sensor that detects a position of the imaging device.

(9)
The control device according to any one of (1) to (8),
in which the imaging-related information includes position information of the imaging device.

(10)
The control device according to any one of (1) to (9),
in which the control unit
changes a type of the imaging-related information to be output on the basis of a result of the determination by the determination unit.

(11)
The control device according to (10),
in which the determination unit
makes at least determination as to whether or not the usage mode of the imaging device is a usage mode as a camera mounted on a mobile device, as the determination of the usage mode, and
the control unit
performs processing of outputting speed information of the imaging device as the imaging-related information in a case where the determination unit determines that the imaging device is the camera mounted on the mobile device.

(12)
The control device according to any one of (1) to (11),
in which the control unit
performs processing of outputting pan information of the imaging device as the imaging-related information in a case where the pan information can be acquired from a fixing device that fixes the imaging device rotatably at least in a pan direction, and performs processing of outputting azimuth information detected by an azimuth sensor that detects an azimuth of the imaging device as the imaging-related information in a case where the pan information cannot be acquired from the fixing device.

(13)
The control device according to any one of (2) to (5),
in which the determination unit
determines whether or not the usage mode of the imaging device is the usage mode as the fixed camera by determining connection of the imaging device to a fixing device that fixes the imaging device.

(14)
The control device according to any one of (1) to (13),
in which the determination unit
determines the usage mode on the basis of plan information of the usage mode set for each of a plurality of the imaging devices.

(15)
A control method including:
determining a usage mode of an imaging device; and
performing output control of imaging-related information related to the imaging device on the basis of the determined usage mode.

(16)
An information processing system including:
a control device including
a determination unit that determines a usage mode of an imaging device, and
a control unit that performs output control of imaging-related information related to the imaging device on the basis of the usage mode determined by the determination unit; and
an information processing device including a display processing unit that performs display processing of information based on the imaging-related information output by the output control of the control unit.

(17)
The information processing system according to (16), further including
a stop determination unit that determines whether or not the imaging device has stopped after movement,
in which the display processing unit
performs display processing of making notification of the imaging device determined to have stopped after movement by the stop determination unit.

REFERENCE SIGNS LIST

1 Imaging device
2 Recording device
3 Switcher
4 Transmitter
5 Information processing device
6 Console 7 Multi-monitor
10 Tripod device
11 Imaging unit
12 Image processing unit
13 Control unit
14 Motion detection unit
15 Position detection unit
16 Azimuth detection unit
17 Communication unit
18 Bus
21 CPU
22 ROM
23 RAM
24 Bus
25 Input/output interface
26 Display control unit
27 Storage unit
28 Communication unit
C Camera icon
Ri Imaging range
Ob Object

The invention claimed is:

1. A control device, comprising:
   circuitry configured to:
      determine a usage mode of an imaging device, wherein the usage mode is determined one of a usage mode as a fixed camera or a usage mode as a handy camera;
      execute output control of imaging-related information related to the imaging device based on the determined usage mode; and
      reduce an output frequency of the imaging-related information based on a determination that the imaging device is the fixed camera as compared to a determination that the imaging device is the handy camera.

2. The control device according to claim 1, wherein the circuitry is further configured to determine that the usage mode of the imaging device is the usage mode as a camera mounted on a mobile device.

3. The control device according to claim 2, wherein based on a determination that the imaging device is the camera mounted on the mobile device, the circuitry is further configured to set an output frequency of the imaging-related information higher than an output frequency of the imaging-related information when the imaging device is the fixed camera and lower than an output frequency of the imaging-related information when the imaging device is the handy camera.

4. The control device according to claim 1, wherein the circuitry is further configured to determine the usage mode based on detection information of a sensor.

5. The control device according to claim 4, wherein the circuitry is further configured to determine the usage mode based on detection information of a motion sensor that detects a motion of the imaging device.

6. The control device according to claim 4, wherein the circuitry is further configured to determine the usage mode based on detection information of a position sensor that detects a position of the imaging device.

7. The control device according to claim 1, wherein the imaging-related information includes position information of the imaging device.

8. The control device according to claim 1, wherein the circuitry is further configured to control a type of the imaging-related information to be output based on a result of the determination.

9. The control device according to claim 8, wherein the circuitry is further configured to:
   determine that the usage mode of the imaging device is a usage mode as a camera mounted on a mobile device, and
   execute processing of outputting speed information of the imaging device as the imaging-related information based on a determination that the imaging device is the camera mounted on the mobile device.

10. The control device according to claim 1, wherein the circuitry is further configured to:
    execute processing of outputting pan information of the imaging device as the imaging-related information based on a determination that the pan information can be acquired from a fixing device that fixes the imaging device rotatably at least in a pan direction, and
    execute processing of outputting azimuth information detected by an azimuth sensor that detects an azimuth of the imaging device as the imaging-related information based on a determination that the pan information cannot be acquired from the fixing device.

11. The control device according to claim 1, wherein the circuitry is further configured to determine that the usage mode of the imaging device is the usage mode as the fixed camera based on a determination of a connection of the imaging device to a fixing device that fixes the imaging device.

12. The control device according to claim 1, wherein the circuitry is further configured to determine the usage mode based on plan information of the usage mode set for each of a plurality of the imaging devices.

13. A control method, comprising:
    determining a usage mode of an imaging device, wherein the usage mode is determined one of a usage mode as a fixed camera or a usage mode as a handy camera;
    executing output control of imaging-related information related to the imaging device based on the determined usage mode; and
    reducing an output frequency of the imaging-related information based on a determination that the imaging device is the fixed camera as compared to a determination that the imaging device is the handy camera.

14. An information processing system, comprising:
    a control device including a circuitry configured to:
       determine a usage mode of an imaging device, wherein the usage mode is determined one of a usage mode as a fixed camera or a usage mode as a handy camera,
       execute output control of imaging-related information related to the imaging device based on the determined usage mode,
       reduce an output frequency of the imaging-related information based on a determination that the imaging device is the fixed camera as compared to a determination that the imaging device is the handy camera; and
       control a display device to display processing of information based on the output imaging-related information.

15. The information processing system according to claim 14, wherein the circuitry is further configured to:
    determine that the imaging device has stopped after movement, and
    control the display device to execute display processing of making notification of the imaging device determined to have stopped after the movement.

* * * * *